(12) United States Patent
Hayashi et al.

(10) Patent No.: US 10,367,962 B2
(45) Date of Patent: *Jul. 30, 2019

(54) INFORMATION PROCESSING SYSTEM, INFORMATION PROCESSING APPARATUS, AND INFORMATION PROCESSING METHOD

(71) Applicants: Yuuichiroh Hayashi, Kanagawa (JP); Dongzhe Zhang, Kanagawa (JP); Ryutaro Sakanashi, Kanagawa (JP)

(72) Inventors: Yuuichiroh Hayashi, Kanagawa (JP); Dongzhe Zhang, Kanagawa (JP); Ryutaro Sakanashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/928,291

(22) Filed: Mar. 22, 2018

(65) Prior Publication Data
US 2018/0213104 A1    Jul. 26, 2018

Related U.S. Application Data

(63) Continuation of application No. 15/417,867, filed on Jan. 27, 2017, now Pat. No. 9,961,225.

(30) Foreign Application Priority Data

Feb. 5, 2016   (JP) .................. 2016-020877
Jun. 22, 2016  (JP) .................. 2016-123684

(51) Int. Cl.
*G06F 3/12*     (2006.01)
*H04N 1/00*     (2006.01)
*G06K 15/00*    (2006.01)

(52) U.S. Cl.
CPC ..... *H04N 1/00949* (2013.01); *H04N 1/00217* (2013.01); *H04N 1/00225* (2013.01);
(Continued)

(58) Field of Classification Search
None
See application file for complete search history.

(56) References Cited

U.S. PATENT DOCUMENTS 9,961,225  B2 *  5/2018  Hayashi .......... H04N 1/00949
2003/0041142 A1  2/2003  Zhang et al.
(Continued)

FOREIGN PATENT DOCUMENTS

JP    2000066980 A    3/2000
JP    2003067207 A    3/2003
(Continued)

*Primary Examiner* — Dov Popovici
(74) *Attorney, Agent, or Firm* — Harness, Dickey & Pierce, P.L.C.

(57) ABSTRACT

An information processing system includes a storage storing flow information in association with application identification information, for each application for executing a sequence of processes, the flow information defining program identification information and an execution order of the programs; a storage storing screen information in association with the application identification information for each application; a transmitter for sending, to a device, the screen information associated with the application identification information, when a first request including the application identification information is received from the device; a receiver for receiving a second request including information relating to the electronic data specified by a user in the screen displayed on the device; an acquirer for acquiring the flow information associated with the application identification information; and an executor for executing the programs identified by the program identification information, in the execution order, to execute the sequence of processes.

9 Claims, 12 Drawing Sheets

(52) U.S. Cl.
CPC ..... *H04N 1/00331* (2013.01); *H04N 1/00464* (2013.01); *H04N 2201/0039* (2013.01); *H04N 2201/0094* (2013.01)

(56) References Cited

U.S. PATENT DOCUMENTS

| | | |
|---|---|---|
| 2004/0057076 A1 | 3/2004 | Hirose et al. |
| 2005/0192929 A1 | 9/2005 | Sumi |
| 2013/0254297 A1 | 9/2013 | Kobayashi |
| 2014/0123240 A1 | 5/2014 | Seo et al. |
| 2016/0241724 A1 | 8/2016 | Sugimura et al. |

FOREIGN PATENT DOCUMENTS

| | | |
|---|---|---|
| JP | 2003157242 A | 5/2003 |
| JP | 2005301985 A | 10/2005 |
| JP | 4039191 B2 | 1/2008 |
| JP | 2013225286 A | 10/2013 |
| JP | 2016154000 A | 8/2016 |

\* cited by examiner

FIG.6

| DATA FORMAT BEFORE CONVERSION | DATA FORMAT AFTER CONVERSION | FORMAT CONVERSION TO BE GENERATED |
|---|---|---|
| InputStream | LocalFilePath | FIRST FORMAT CONVERSION |
| LocalFilePath | File | SECOND FORMAT CONVERSION |
| ... | ... | ... |

```
From("file:input")        }1101
.to("ocr:ocr_process")
.to("mail:send?mail_address=null&filename=null")  }1102
```

~1100

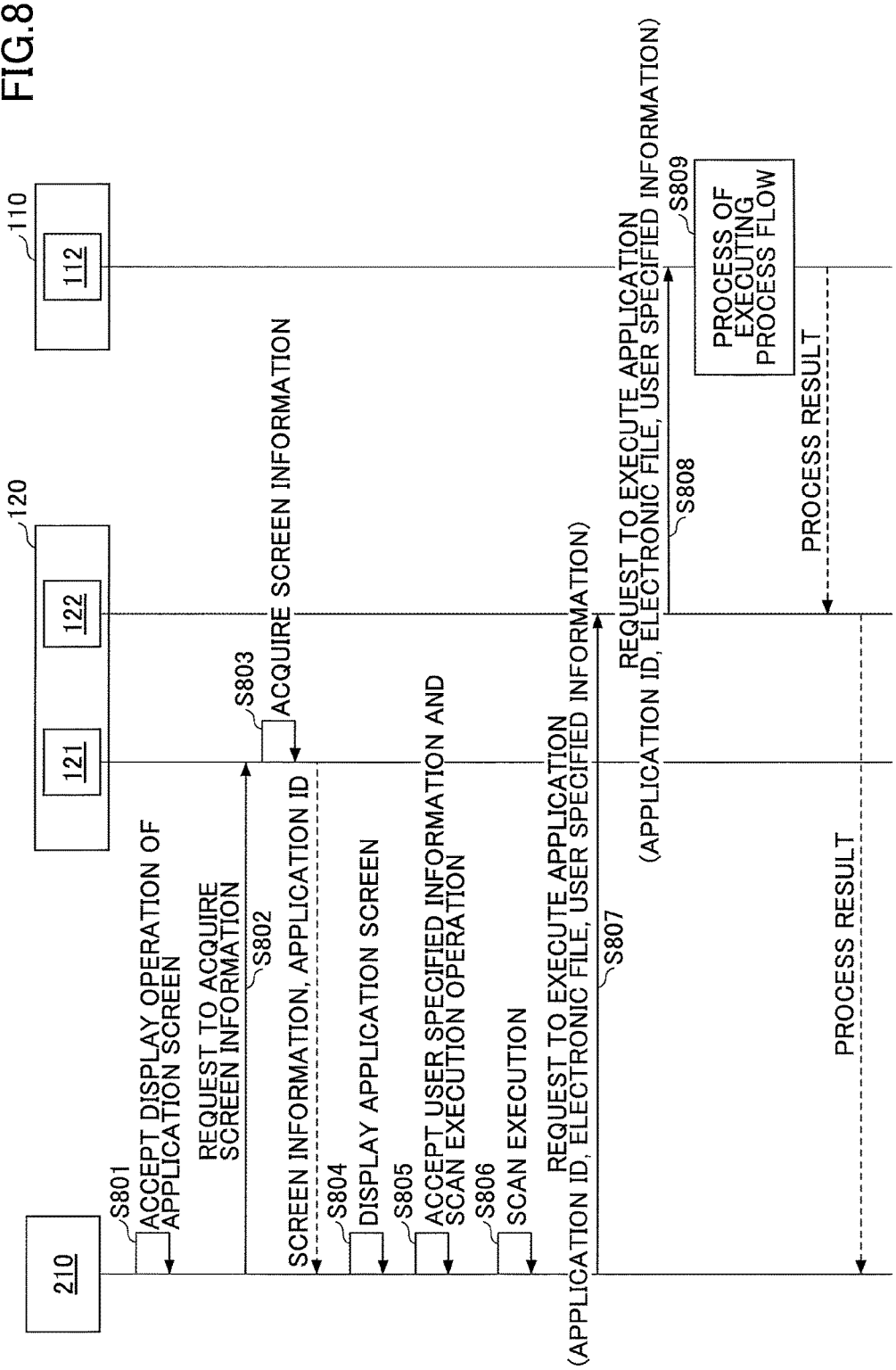

FIG.9

```
<html>
<head>
 ...
</head>
<body>
<h1>Scan To Mail Application</h1> }2001
<form name="mail:send">
<ul>
  <li class="filename">
    <label for="filename">Attachment fileName<label>
    <input id="filename" type="text" name="filename" size="30">  }2002
  </li>
  <li class="mail_address">
    <label for="mail_address">Destination e-mail address</label>
    <input id="mail_address" type="text" name="mail_address" size="30">  }2003
  </li>
  <li>
    <button onclick="scan_function()">Scan</button>  }2004
  </li>
</ul>
</form>
</body>
</html>
```

2000

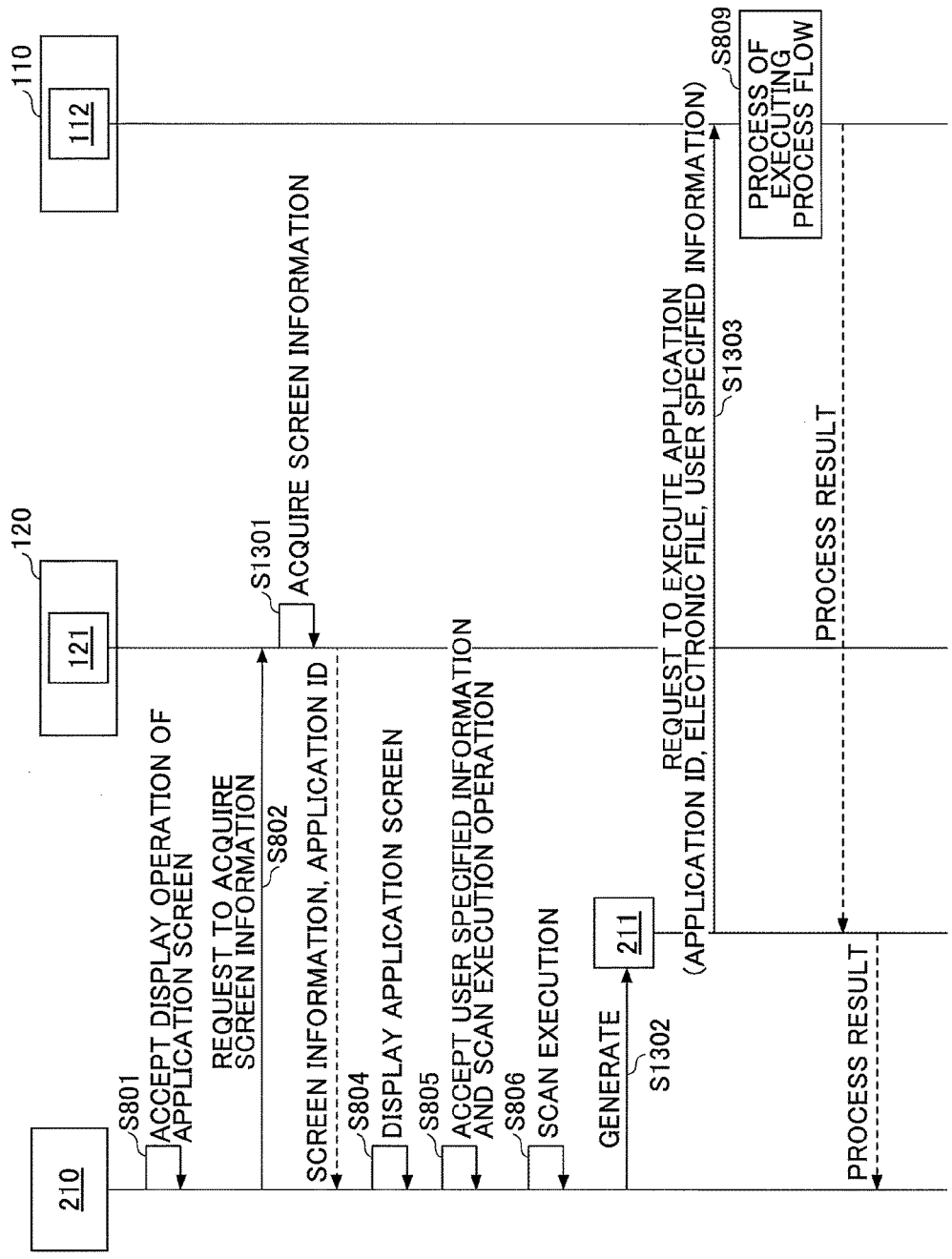

INFORMATION PROCESSING SYSTEM, INFORMATION PROCESSING APPARATUS, AND INFORMATION PROCESSING METHOD

CROSS-REFERENCE TO RELATED APPLICATION

This application is a continuation of U.S. application Ser. No. 15/417,867, filed on Jan. 27, 2017, which claims priority under 35 U.S.C. § 119 of Japanese Patent Application No. 2016-020877, filed on Feb. 5, 2016 and Japanese Patent Application No. 2016-123684, filed on Jun. 22, 2016, the contents of each of which are incorporated herein by reference in their entirety.

BACKGROUND OF THE INVENTION

1. Field of the Invention

The present invention relates to an information processing system, an information processing apparatus, and an information processing method.

2. Description of the Related Art

In recent years, a service of providing a function in which a plurality of functions (for example, scanning, printing, and mail delivery, etc.) are combined, has become known. For example, there is known a service of mailing/delivering electronic data, which has been generated by scanning. Such a service is realized as one or more processes realizing functions, are executed as a sequence of processes.

Furthermore, there is known an image forming apparatus for executing a sequence of processes based on an instruction including process information, etc., expressing one or more processes as a sequence of processes (see, for example, patent document 1).

Patent Document 1: Japanese Patent No. 4039191

SUMMARY OF THE INVENTION

An aspect of the present invention provides an information processing system, an information processing apparatus, and an information processing method, in which one or more of the above-described disadvantages are reduced.

According to one aspect of the present invention, there is provided an information processing system including a plurality of programs for executing predetermined processes, the information processing system being coupled, via a network, to one or more devices in which a web browser is installed, the information processing system including one or more information processing apparatuses for implementing various functions of the information processing system, the information processing system including an application information storage configured to store flow information in association with application identification information identifying an application, with respect to each of the applications for executing a sequence of processes using electronic data, the flow information defining program identification information identifying one or more of the programs for executing each of the processes in the sequence of processes and an execution order of executing the one or more of the programs; a screen information storage configured to store screen information in association with the application identification information with respect to each of the applications, the screen information defining a screen in a format that is interpretable by the web browser; a transmitter configured to send, to a first device that is a source of a first request, the screen information stored in the screen information storage in association with the application identification information included in the first request, when the first request including the application identification information is received from the first device among the one or more devices; a receiver configured to receive a second request including information relating to the electronic data specified by a user in the screen displayed on the first device, the screen being displayed as the web browser interprets the screen information sent from the transmitter; an acquirer configured to acquire the flow information stored in the application information storage in association with the application identification information, when the receiver receives the second request; and an executor configured to execute the one or more of the programs identified by the program identification information defined in the flow information acquired by the acquirer, in the execution order defined in the flow information, to execute the sequence of processes using the electronic data based on the information relating to the electronic data included in the second request received by the receiver.

BRIEF DESCRIPTION OF THE DRAWINGS

Other objects, features and advantages of the present invention will become more apparent from the following detailed description when read in conjunction with the accompanying drawings, in which:

FIG. 6 illustrates an example of a format conversion information table according to the first embodiment of the present invention;

FIG. 7 illustrates an example of process flow information according to the first embodiment of the present invention;

FIG. 8 is a sequence diagram of an example of the overall process of the "scan to mail delivery" service according to the first embodiment of the present invention;

FIG. 9 illustrates an example of screen information according to the first embodiment of the present invention;

FIG. 13 is a sequence diagram of an example of the overall process of the "scan to mail delivery" service according to the second embodiment of the present invention.

DETAILED DESCRIPTION OF THE PREFERRED EMBODIMENTS

In the technology of the related art, there are cases where it is necessary to develop an application to be installed in the image forming apparatus in order to execute the sequence of processes. In these cases, it may be necessary to add and correct, etc., the application installed in the image forming apparatus, in association with the addition or the deletion of a function, etc.

Therefore, the labor hours, which are required for developing the application to be installed in the image forming apparatus, may increase.

A problem to be solved by an embodiment of the present invention is to support the development of an application for performing a sequence of processes.

Embodiments of the present invention will be described by referring to the accompanying drawings.

First Embodiment

<System Configuration>

Figure 1:
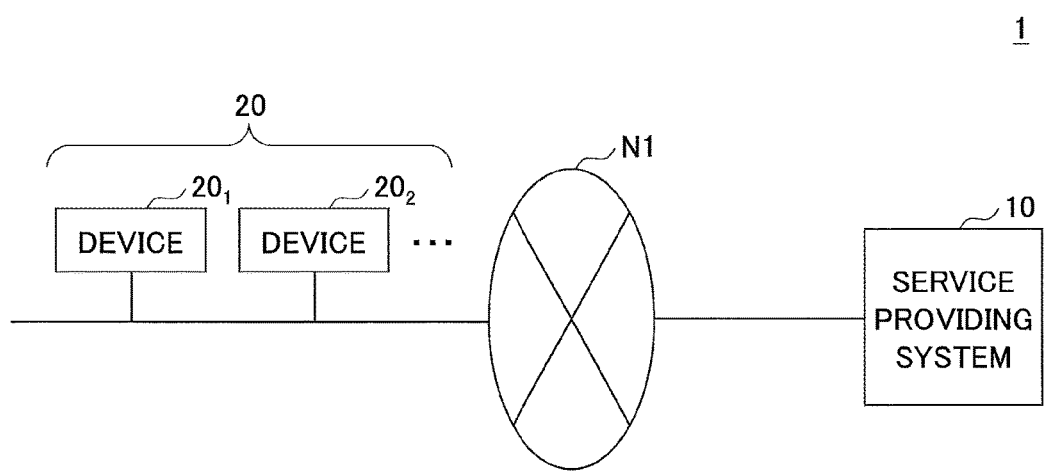
FIG. 1 is a diagram illustrating an exemplary system configuration of an information processing system according to a first embodiment of the present invention.

Referring to FIG. 1, an information processing system 1 according to the present embodiment is described. FIG. 1 is a diagram illustrating an exemplary system configuration of the information processing system 1 according to the present embodiment.

The information processing system 1 illustrated in FIG. 1 includes a service providing system 10 and a device 20, which are communicably coupled through a wide area network N1 such as the Internet.

The service providing system 10 is implemented by at least one information processing apparatus and provides various services realized by a sequence of processes, which is formed by combining one or more processes among a plurality of processes for realizing various functions, via the network N1.

Here, a function is a function relevant to an electronic file such as a document file and an image file. Examples of functions are printing, scanning, fax transmission, conversion of data formats, mail delivery, an optical character recognition (OCR) process, processing, compressing/decompressing, and storing in a repository, etc.

The service provided by the service providing system 10 according to the present embodiment is specifically described below. Hereinafter, the sequence of processes is also referred to as a "process flow".

The devices 20 are various electronic devices used by a user. That is, the device 20 is, for example, an image forming apparatus such as a multifunction peripheral (MFP), a personal computer (PC), a projector, an electronic whiteboard, a digital camera, or the like. The user uses the device 20 to use various services provided by the service providing system 10.

Hereinafter, when each of the plurality of devices 20 is distinguished, a suffix is added such as a "device $20_1$," and a "device $20_2$".

The configuration of the information processing system 1 illustrated in FIG. 1 is an example and the information processing system 1 may have other configurations. For example, the information processing system 1 according to the present embodiment includes various devices, each of which performs at least one of an input and an output of the electronic data. These devices may use services provided by the service providing system 10.

<Hardware Configuration>

Figure 2:
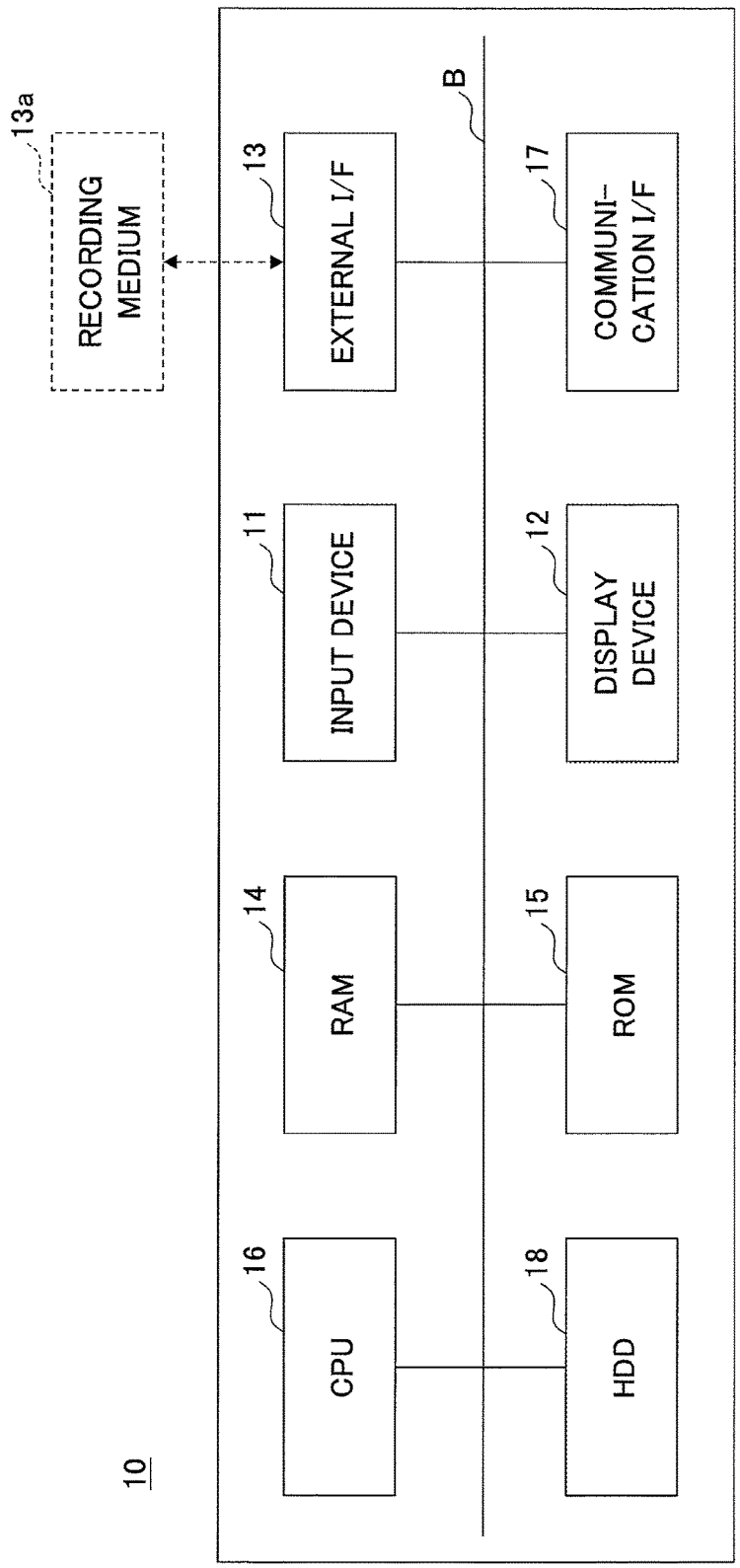
FIG. 2 is a diagram illustrating a hardware configuration of an exemplary service providing system according to the first embodiment of the present invention.

Referring to FIG. 2, described next is the hardware configuration of the service providing system 10 included in the information processing system 1 according to the first embodiment. FIG. 2 is a diagram illustrating the hardware configuration of an exemplary service providing system 10 according to the first embodiment.

The service providing system 10 illustrated in FIG. 2 includes an input device 11, a display device 12, an external interface (I/F) 13, and a random access memory (RAM) 14. Further, the service providing system 10 includes a read only memory (ROM) 15, a central processing unit (CPU) 16, a communication interface (I/F) 17, and a hard disk drive (HDD) 18. The ROM 15, the CPU 16, the communication I/F 17, and the HDD 18 are connected by the bus B.

The input device 11 includes a keyboard, a mouse, a touch panel, and the like, by which the user inputs various operation signals. The display device 12 includes a display or the like to display a process result acquired by the service providing system 10. At least one of the input device 11 and the display device 12 may be in a mode of being connected to the service providing system 10 so as to be used.

The communication I/F 17 is an interface provided to couple the service providing system 10 with the network N1. Thus, the service providing system 10 can communicate with another device through the communication I/F 17.

The HDD 18 is a non-volatile memory device that stores programs and data. The programs and data stored in the HDD 18 are an operating system (OS), which is basic software controlling the entire service providing system 10, application software providing various functions in the OS, and so on.

The service providing system 10 may use a drive device (e.g., a solid state drive (SSD)) using a flash memory as a memory medium in place of the HDD 18. Further, the HDD 18 administers the stored programs and the stored data using at least one of a predetermined file system and a predetermined database (DB).

The external I/F 13 is an interface with an external device. The external device includes a recording medium 13a and so on. With this, the service providing system 10 can read information from the recording medium 13a and write information to the recording medium 13a through the external I/F 13. The recording medium 13a is a flexible disk, a CD, a DVD, an SD memory card, a USB memory, or the like.

The ROM 15 is a non-volatile semiconductor memory that can store a program or data even when a power source is powered off. The ROM 15 stores a program and data such as a basic input/output system (BIOS), an operating system (OS) setup, a network setup, or the like, which are executed at a time of starting up the service providing system 10. The RAM 14 is a volatile semiconductor memory configured to temporarily store the program and the data.

The CPU 16 reads the program and/or data from the memory device such as the ROM 15 and the HDD 18. The read program or the read data undergo a process to thereby realize control or a function of the entire service providing system 10.

The service providing system 10 of this embodiment can realize various processes described below by having the above hardware configuration of the service providing system 10 illustrated in FIG. 2.

Figure 3:
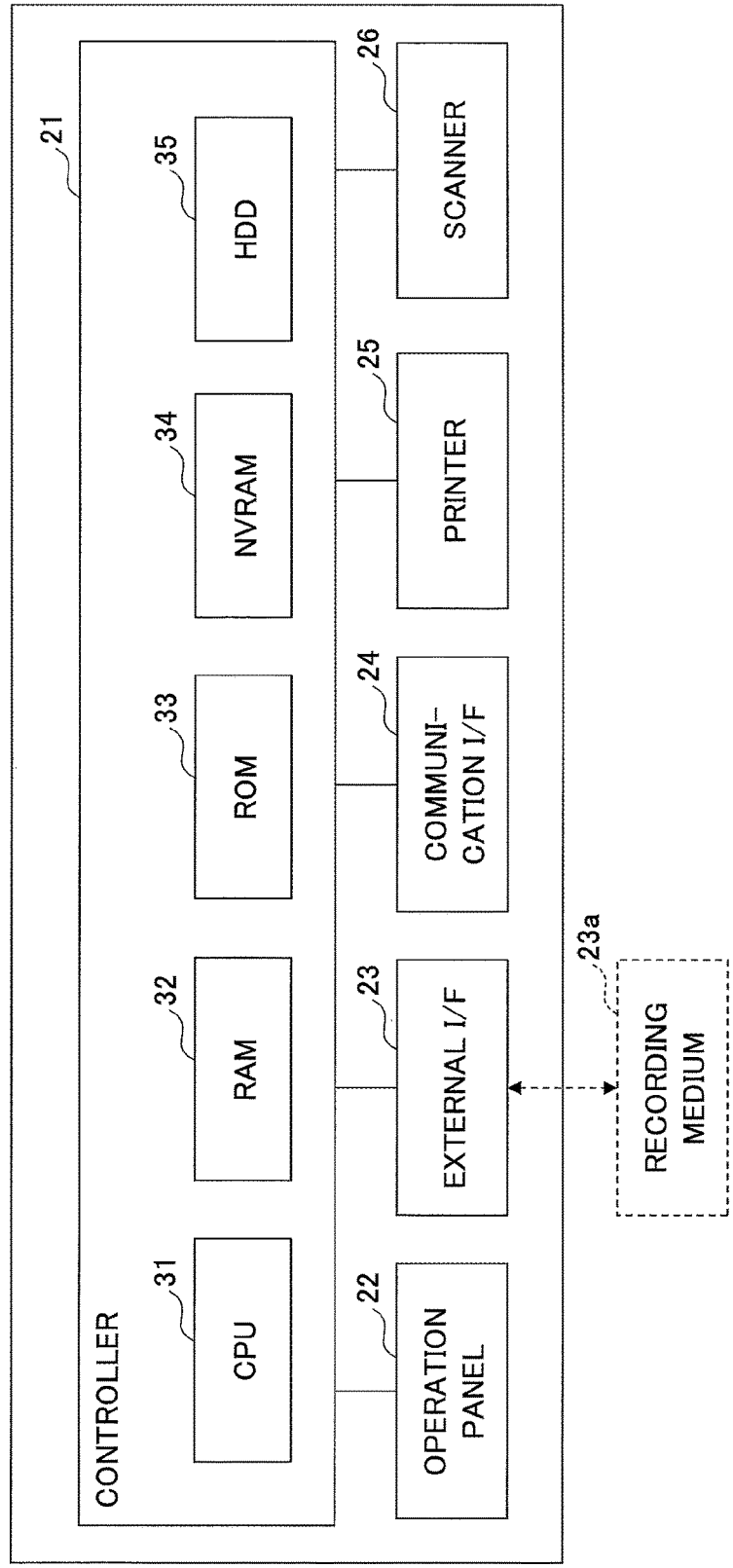
FIG. 3 is a diagram illustrating a hardware configuration of an exemplary device according to the first embodiment of the present invention.

Referring to FIG. 3, described next is the hardware configuration of an image forming apparatus, which is the device 20 included in the information processing system 1 of the embodiment. FIG. 3 is a diagram illustrating a hardware configuration of an exemplary device 20 according to the first embodiment.

The device 20 illustrated in FIG. 3 includes a controller 21, an operation panel 22, an external interface (I/F) 23, a communication I/F 24, a printer 25, and a scanner 26. The controller 21 includes a central processing unit (CPU) 31, a random access memory (RAM) 32, a read only memory (ROM) 33, a non-volatile random access memory (NVRAM) 34, and a hard disk drive (HDD) 35.

The ROM 33 is a non-volatile semiconductor memory that stores various programs and data. The RAM 32 is a volatile semiconductor memory configured to temporarily store the program and the data. For example, setup information or the like is stored in the NVRAM 34. The HDD 35 is a non-volatile memory device that stores the various programs and data.

The CPU 31 reads the program, the data, setup information, or the like into the RAM 32 from the ROM 33, the NVRAM 34, the HDD 35, or the like, and executes the process. Thus, the CPU 31 is an arithmetic device realizing control and a function of the entire device 20.

The operation panel 22 includes an input unit configured to receive an input from the user and a display unit configured to display. The external I/F 23 is an interface with the external device. The external device includes a recording medium 23a and so on. With this, the device 20 can perform at least one of reading information from the recording medium 23a through the external I/F 23 and writing the information to the recording medium 23a through the external I/F 23. The recording medium 23a is, for example, an IC card, a flexible disk, a compact disc (CD), a digital versatile disc (DVD), a secure digital (SD) memory card, and a universal serial bus (USB) memory.

The communication I/F 24 is an interface coupling the device 20 with the network N1. Thus, the device 20 can perform data communications through the communication I/F 24. The printer 25 is provided to print data. The scanner 26 is a reading device that reads an original and generates an electronic file (an image file).

The device 20 according to the first embodiment includes a hardware configuration illustrated in FIG. 3 to realize various processes described below.

<Service Provided by Service Providing System>

The service provided by the service providing system 10 according to the first embodiment is described. Hereinafter, a description is given of a case where the device 20 is an image forming apparatus.

The service providing system 10 according to the present embodiment provides a service of performing an OCR process on an electronic file (image file) generated by scanning an original document at the device 20, and mailing/delivering the electronic file to a mail address specified by a user.

In the following descriptions, it is assumed that the service providing system 10 according to the present embodiment provides the above service (a "scan to mail delivery" service).

However, the service provided by the service providing system 10 is not limited to the above. For example, the service providing system 10 may provide a service of compressing an electronic file generated by scanning an original document at the device 20, and storing the electronic file in a repository. Furthermore, the service providing system 10 may provide a service of processing an electronic file generated by scanning an original document at the device 20 (for example, adding a predetermined word to the electronic file), and sending the electronic file by fax transmission.

Furthermore, for example, when the device 20 is an electronic blackboard, etc., the service providing system 10 according to the present embodiment may provide a service of processing the electronic file generated by the device 20 that is an electronic blackboard, and mailing/delivering the electronic file.

<Functional Configuration>

Figure 4:
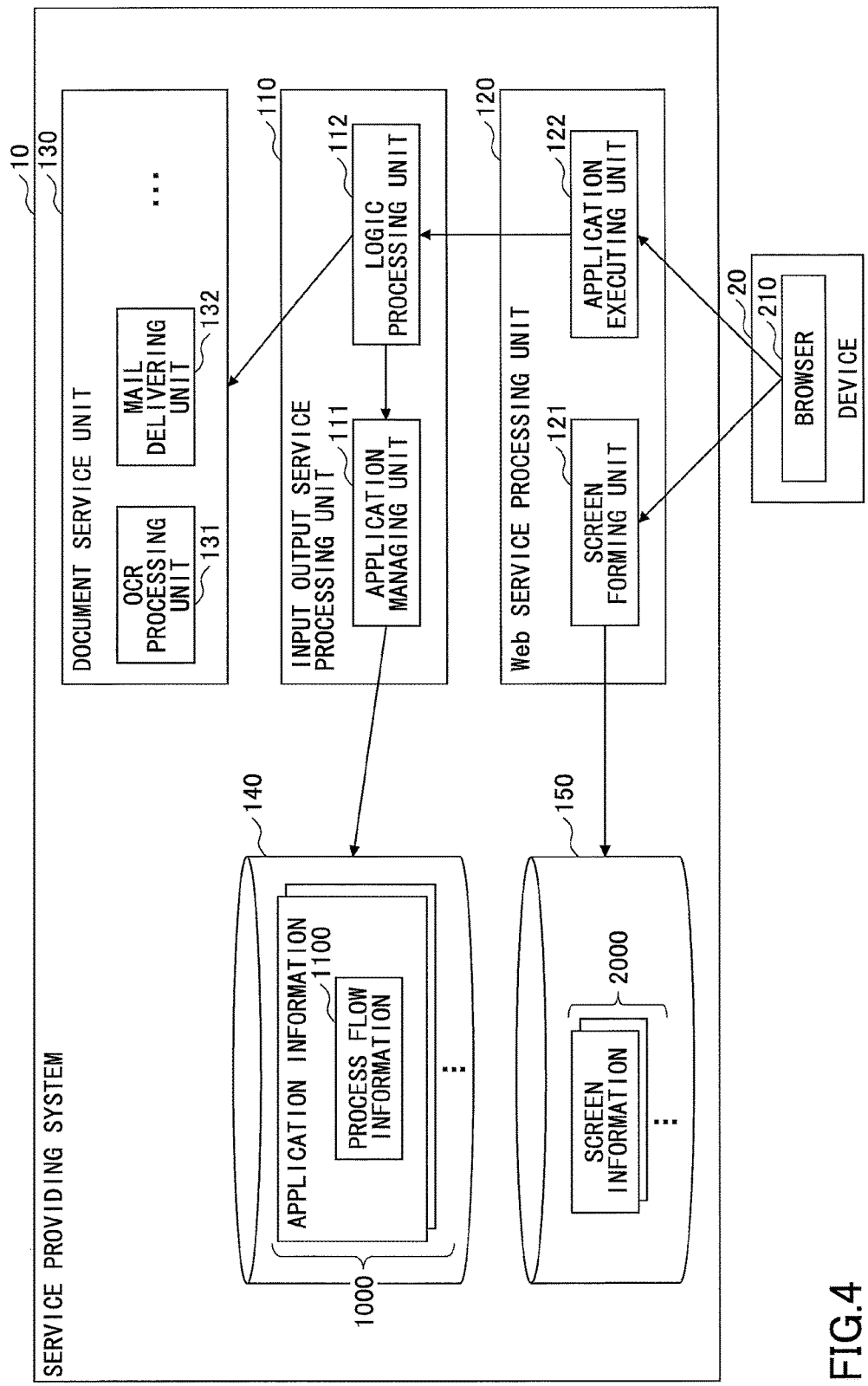
FIG. 4 illustrates a functional configuration of an example of the information processing system according to the first embodiment of the present invention.

Next, a description is given of a functional configuration of the information processing system 1 according to the present embodiment, by referring to FIG. 4. FIG. 4 illustrates a functional configuration of an example of the information processing system 1 according to the present embodiment.

The device 20 illustrated in FIG. 4 includes a web browser 210 (hereinafter, simply referred to as a "browser 210") executed by, for example, the CPU 31, etc. The user of the device 20 is able to use a service provided by the service providing system 10, via the browser 210.

In this way, the device 20 according to the present embodiment can function by having the browser 210 installed. Therefore, in the device 20 according to the present embodiment, there is no need to install an exclusive-use application program for using a service provided by the service providing system 10.

The service providing system 10 illustrated in FIG. 4 includes an input output service processing unit 110, a web service processing unit 120, and a document service unit 130. These functional units are realized by a process that the CPU 16 is caused to execute by one or more programs installed in the service providing system 10.

Furthermore, the service providing system 10 includes an application information storage unit 140 and a screen information storage unit 150. These storage units can be realized by the HDD 18. Note that at least one of the application information storage unit 140 and the screen information storage unit 150 may be realized by a storage device, etc., that is connected to the service providing system 10 via a network.

The input output service processing unit 110 performs a process relevant to a service provided by the service providing system 10. Here, the input output service processing unit 110 includes an application managing unit 111 and a logic processing unit 112.

The application managing unit 111 manages application information 1000 stored in the application information storage unit 140. Note that the application information 1000 is an application for providing a service realized by a sequence of processes. That is, the various services provided by the service providing system 10 are provided according to the application information 1000.

Furthermore, the application managing unit 111 returns process flow information 1100 included in the application information 1000, in response to a request from the logic processing unit 112. Note that the process flow information 1100 defines a sequence of processes for realizing the service provided by the application information 1000.

The logic processing unit 112 acquires the process flow information 1100 included in the application information 1000, from the application managing unit 111, in response to a request from the web service processing unit 120. Then, the logic processing unit 112 executes a sequence of processes (process flow) for realizing a service provided by the application information 1000, based on the process flow information 1100 acquired from the application managing unit 111. Accordingly, the service providing system 10 according to the present embodiment is able to provide various services. Note that details of the logic processing unit 112 are described below.

The web service processing unit 120 performs a process for a user to use a service provided by the service providing system 10, by using the browser 210. That is, the web service processing unit 120 functions as an application server for providing a web application (application information 1000) to the browser 210. Here, the web service processing unit 120 includes a screen forming unit 121 and an application executing unit 122.

The screen forming unit 121 returns screen information 2000 stored in the screen information storage unit 150, in response to a request from the browser 210. Note that the screen information 2000 is information defining a screen (application screen) for using a service provided according to the application information 1000. The screen information 2000 defines an application screen in a format that can be interpreted by the browser 210, such as HyperText Markup Language (HTML), Extensible HyperText Markup Language (XHTML), Cascading Style Sheets (CSS), and JavaScript (registered trademark), etc.

Accordingly, on the operation panel 22 of the device 20, an application screen for using a service provided by the service providing system 10, is displayed by the browser 210.

The application executing unit 122 returns a request to execute an application (application information 1000) to the input output service processing unit 110, in response to a request from the browser 210.

The document service unit 130 executes processes included in the sequence of processes (process flow) based on the process flow information 1100. Here, the document service unit 130 includes an OCR processing unit 131 and a mail delivering unit 132.

The OCR processing unit 131 performs an OCR process on the electronic file (image file). The mail delivering unit 132 creates a mail to which the electronic file is attached, and delivers the mail to a specified mail address.

Note that the document service unit 130 may include, for example, a data converting unit for converting the data format of the electronic file into predetermined data, and a compression/decompression processing unit for compressing or decompressing the electronic file.

As described above, the document service unit 130 includes various functional units for executing processes included in a sequence of processes (process flow). Therefore, the document service unit 130 is realized by a group of programs (modules) providing these functions.

The application information storage unit 140 stores the application information 1000. The application information 1000 is stored in the application information storage unit 140, in association with an application ID for uniquely identifying the application information 1000. Note that an application name of the application information 1000 may also be associated with the application information 1000.

Here, the application information 1000 includes the process flow information 1100. For example, the application information 1000 for providing a "scan to mail delivery" service includes the process flow information 1100 in which a sequence of processes for realizing the service is defined. That is, the application information 1000 for providing a "scan to mail delivery" service includes the process flow information 1100 defining a process of performing an OCR process on an electronic file generated by scanning and then mailing/delivering the electronic file to a specified mail address.

Note that the application information 1000 may include two or more process flow information items 1100. For example, the application information 1000 providing "scan to mail delivery" may include process flow information 1100A in which a process of performing an OCR process in English on an electronic file and then mailing/delivering the electronic file is defined, and process flow information 1100B in which a process of performing an OCR process in Japanese on an electronic file and then mailing/delivering the electronic file is defined.

As described above, the process flow information 1100 is information defining a sequence of processes (process flow) for realizing a service provided by the application information 1000. Note that details of the process flow information 1100 are described below.

The screen information storage unit 150 stores the screen information 2000. The screen information 2000 is stored in the screen information storage unit 150, in association with an application ID. Note that details of the screen information 2000 are described below.

Note that the input output service processing unit 110, the web service processing unit 120, the document service unit 130, the application information storage unit 140, and the screen information storage unit 150 may be realized by different information processing apparatuses. Particularly, the web service processing unit 120 and the screen information storage unit 150 may be realized by one information processing apparatus, as an application server.

Figure 5:
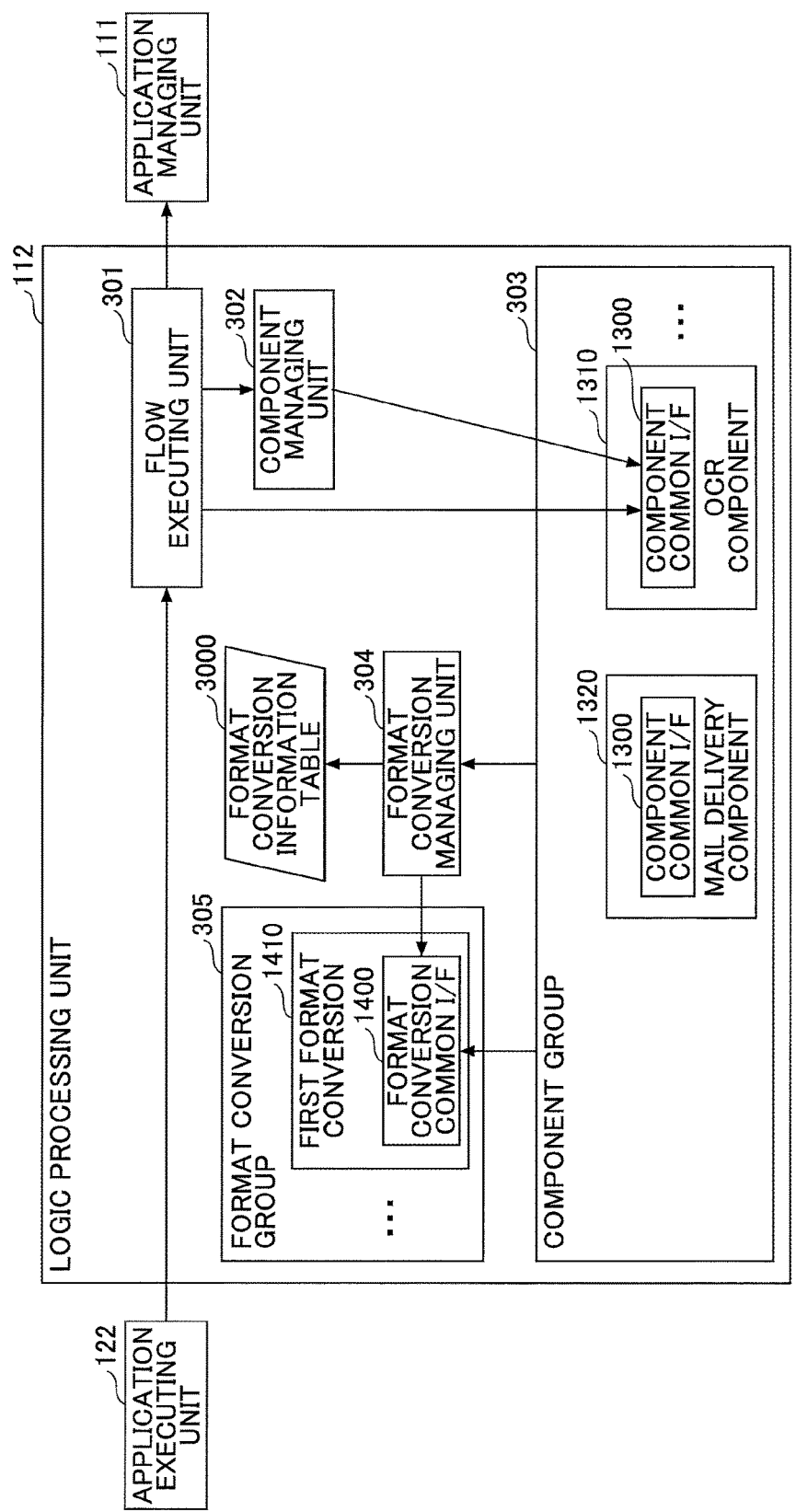
FIG. 5 illustrates an example of a functional configuration of a logic processing unit according to the first embodiment of the present invention.

Here, a description is given of details of the functional configuration of the logic processing unit 112, by referring to FIG. 5. FIG. 5 illustrates an example of a functional configuration of the logic processing unit 112 according to the present embodiment.

The logic processing unit 112 illustrated in FIG. 5 includes a flow executing unit 301, a component managing unit 302, a component group 303, a format conversion managing unit 304, and a format conversion group 305. Furthermore, the logic processing unit 112 uses a format conversion information table 3000.

When the flow executing unit 301 receives a request to execute an application from the application executing unit 122, the flow executing unit 301 acquires the process flow information 1100 included in the application information 1000 corresponding to the execution request, from the application managing unit 111. Then, the flow executing unit 301 executes a sequence of processes (process flow) based on the process flow information 1100 acquired from the application managing unit 111.

Here, a sequence of processes based on the process flow information 1100 is executed by combining components for executing processes included in the sequence of processes. Note that a component is realized by a program and a module for executing a process realizing a predetermined function, and is defined by a class and a function, etc.

The component managing unit 302 manages a component. The component managing unit 302 generates a component in response to a request from the flow executing unit 301, and returns the generated component to the flow executing unit 301. Note that generating a component means, for example, loading a component defined by a class or a function, etc., in a memory (for example, the RAM 14).

The component group 303 is an assembly of components. The component group 303 includes an OCR component 1310 and a mail delivery component 1320.

The OCR component 1310 is a component for performing an OCR process on an electronic file. The OCR component 1310 sends a request to the OCR processing unit 131 of the document service unit 130, to perform an OCR process on an electronic file.

The mail delivery component 1320 is a component for delivering a mail to a specified mail address. The mail delivery component 1320 sends a request to the mail delivering unit 132 of the document service unit 130, to perform a process of delivering a mail to a specified mail address.

As described above, each component uses the document service unit 130 to execute a process for realizing a predetermined function. Note that the component group 303 also includes various components such as a conversion component for converting the data format of an electronic file into a predetermined data format and a compression component for compressing an electronic file, other than the above components.

Furthermore, each component included in the component group 303 includes a component common I/F 1300. The component common I/F 1300 is an application programming interface (API) that is commonly defined for the components, and includes an API for generating a component and an API for executing a process of the component.

As described above, the components include the component common I/F 1300, and therefore the influence caused by the addition, etc., of a component can be localized. That is, for example, the addition, etc., of a component can be performed without influencing the flow executing unit 301 or the component managing unit 302, etc. Accordingly, in the service providing system 10 according to the present embodiment, the development labor hours associated with the addition, etc., of a predetermined function (i.e., the addition, etc., of a component for executing a process for realizing a function) can be reduced.

The format conversion managing unit 304 manages the format conversion of the data format. Here, the data format that each component can handle is defined in advance. Therefore, in response to a request from a component, the format conversion managing unit 304 refers to the format conversion information table 3000, for example, as illustrated in FIG. 6, and generates a format conversion to be included in the format conversion group 305.

Then, the format conversion managing unit 304 requests the generated format conversion to execute a format conversion process. Note that format conversion is realized by a program or a module, etc., for executing a format conversion process of converting the data format, and is defined by, for example, a class and a function, etc. Furthermore, the generation of format conversion means, for example, to load the format conversion defined by a class in a memory (for example, the RAM 14).

Note that examples of data formats are a data format "InputStream" indicating stream data, "LocalFilePath" indicating the path (address) of the electronic file stored in a storage device, etc., and "File" indicating the entity of an electronic file, etc.

Here, a description is given of the format conversion information table 3000, by referring to FIG. 6. FIG. 6 illustrates an example of the format conversion information table 3000.

The format conversion information table 3000 includes a data format before conversion, a data format after conversion, and a format conversion to be generated, as data items. That is, the format conversion information stored in the format conversion information table 3000 is information in which a format conversion for converting a data format before conversion into a data format after conversion, is associated with each data format before conversion and each data format after conversion.

The format conversion group 305 is an assembly of format conversions. The format conversion group 305 includes a first format conversion 1410 for converting a data format "InputStream" into "LocalFilePath". Note that the format conversion group 305 also includes, for example, a second format conversion for converting a data format "LocalFilePath" into "File".

Furthermore, each format conversion included in the format conversion group 305 includes a format conversion common I/F 1400. The format conversion common I/F 1400 is an API that is commonly defined for the format conversions, and includes an API for generating a format conversion and an API for executing a format conversion process to convert the format.

As described above, the format conversions include the format conversion common I/F 1400, and therefore the influence caused by the addition, etc., of a format conversion can be localized. That is, for example, the addition, etc., of a format conversion can be performed without influencing the format conversion managing unit 304, etc. Accordingly, in the service providing system 10 according to the present embodiment, the development labor hours associated with the addition, etc., of a format conversion can be reduced.

Here, a description is given of the process flow information 1100 included in the application information 1000 for providing a "scan to mail delivery" service, by referring to FIG. 7. FIG. 7 illustrates an example of the process flow information 1100.

The process flow information 1100 illustrated in FIG. 7 is information defining a sequence of processes (process flow) for realizing the "scan to mail delivery" service. That is, in the process flow information 1100 illustrated in FIG. 7, a process definition 1101 and a process definition 1102, which respectively indicate processes forming the sequence of processes for realizing the "scan to mail delivery" service, are defined.

Here, the process definition 1101 and the process definition 1102 are defined in the format of "component name: process content? option parameter". Note that an operation parameter is to be defined only in a case where, for example, a component, which is indicated by a component name and a process content, requires an operation parameter in order to perform a process (that is, the definition of an operation parameter is optional). Furthermore, when defining a plurality of operation parameters, the operation parameters are defined by being connected by "&".

In the process definition 1101, "ocr:ocr_process" is defined. This means to perform an OCR process by the OCR component 1310. Note that in the process definition 1101, an option parameter is not defined.

In the process definition 1102, "mail:send" is defined. This means that a mail delivery process is performed by the mail delivery component 1320.

Furthermore, in the process definition 1102, "?mail_address=null&filename=null" is defined. This means to mail/deliver an electronic file having a file name specified in "filename", to a mail address specified in "mail_address". Note that in the example of FIG. 7, no values are specified in "mail_address" or "filename" (that is, null).

As described above, in the process flow information 1100, process definitions of the respective processes forming a sequence of processes (process flow) are defined. Accordingly, the service providing system 10 according to the present embodiment is able to execute a sequence of processes for realizing a service provided according to the application information 1000, by performing the processes by the components, in compliance with the process definitions included in the application information 1000.

Note that the processes defined in the process definitions included in the process flow information 1100 illustrated in FIG. 7 are executed in an order starting from the top process. That is, the processes in a sequence of processes based on the process flow information 1100 in FIG. 7 are executed in the order of the process defined in the process definition 1101 and the process defined in the process definition 1102. However, the order of executing the processes is not so limited; for example, the process flow information 1100 may include information defining the order of executing the processes defined in the process definitions.

<Process Details>

Next, a description is given of details of processes by the information processing system 1 according to the present embodiment. In the following, a description is given of the overall process in a case where the user of the device 20 uses a "scan to mail delivery" service, by referring to FIG. 8. FIG. 8 is a sequence diagram of an example of the overall process of the "scan to mail delivery" service according to the present embodiment.

First, the browser 210 of the device 20 accepts an operation (display operation) for displaying an application screen of the "scan to mail delivery" service (step S801).

When the display operation is accepted, the browser 210 of the device 20 sends a request to acquire screen information for displaying an application screen of the "scan to mail delivery" service, to the screen forming unit 121 of the web service processing unit 120 (step S802). Note that acquisition request is, for example, a Hypertext Transfer Protocol (HTTP) request, and in the acquisition request, a Uniform Resource Locator (URL) of the application information 1000 for providing the "scan to mail delivery" service is specified. At this time, the acquisition request may include the application ID of the application information 1000 for providing the "scan to mail delivery" service.

When the request to acquire the screen information is received, the screen forming unit 121 of the web service processing unit 120 acquires, from the screen information storage unit 150, the screen information 2000 associated with the application ID corresponding to the URL specified in the acquisition request (step S803). Then, the screen forming unit 121 of the web service processing unit 120 returns the screen information 2000 acquired from the screen information storage unit 150, to the browser 210. That is, the screen forming unit 121 returns a HTTP response including the screen information 2000 acquired from the screen information storage unit 150, to the browser 210. Note that at this time, the screen forming unit 121 also returns the application ID corresponding to the URL, to the browser 210.

Here, a description is given of the screen information 2000 for displaying an application screen of the "scan to mail delivery" service, by referring to FIG. 9. FIG. 9 illustrates an example of the screen information 2000.

The screen information 2000 illustrated in FIG. 9 is information defined in a HTML format. The screen information 2000 includes an index definition 2001, a file name input field definition 2002, a mail address input field definition 2003, and a scan execution button definition 2004. As described above, in the screen information 2000, the application screen is defined in a format that can be interpreted by the browser 210, such as a HTML tag, etc. Accordingly, the browser 210 is able to display application screen 2100 described below, based on the screen information 2000 illustrated in FIG. 9.

Figure 10:
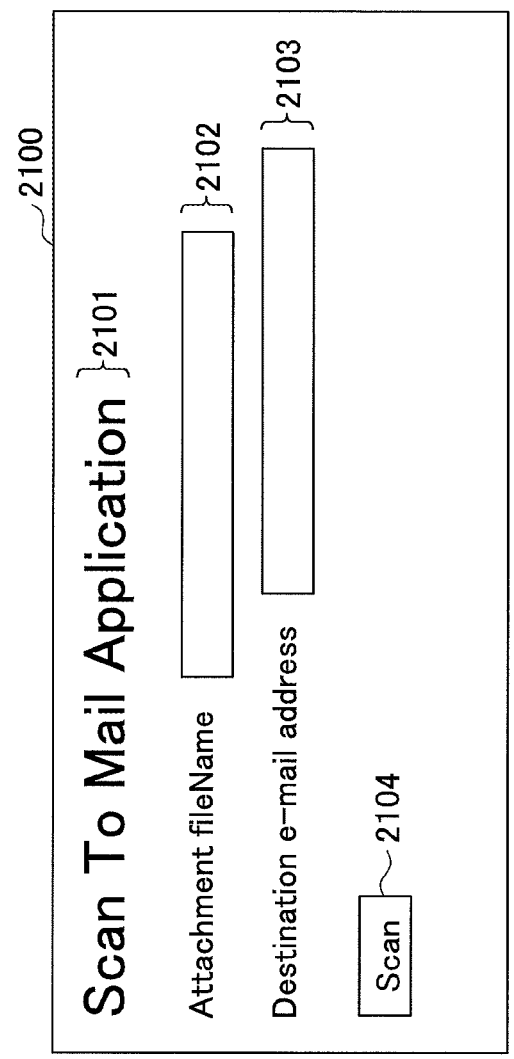
FIG. 10 illustrates an example of an application screen according to the first embodiment of the present invention.

When the screen information 2000 is received from the screen forming unit 121, next, the browser 210 of the device 20 displays, for example, the application screen 2100 illustrated in FIG. 10, based on the screen information 2000 (step S804).

The application screen 2100 illustrated in FIG. 10 is a screen displayed by the browser 210 based on the screen information 2000 illustrated in FIG. 9. The application screen 2100 illustrated in FIG. 10 includes a title 2101, a file name input field 2102, a mail address input field 2103, and a scan execution button 2104.

Here, the title 2101 is, for example, an application name of the application information 1000 providing the "scan to mail delivery" service. The file name input field 2102 is an input area where the user specifies the file name of the electronic file to be attached to the mail (that is, the electronic file obtained by performing an OCR process on the electronic file generated by scanning). The mail address input field 2103 is an input area where the user specifies the mail address to be the delivery destination of the mail.

Note that the title 2101 and the file name input field 2102 are displayed as the browser 210 interprets the index definition 2001 and the file name input field definition 2002, respectively. Furthermore, similarly, the mail address input field 2103 and the scan execution button 2104 are displayed as the browser 210 interprets the mail address input field definition 2003 and the scan execution button definition 2004, respectively.

As described above, the service providing system 10 according to the present embodiment returns the screen information 2000 defined in a format that can be interpreted by the browser 210 such as the HTML format, etc., in response to a request from the browser 210 of the device 20. Then, the device 20 displays an application screen for using a service, based on the screen information 2000 returned from the service providing system 10. Therefore, the user is able to use a service provided by the service providing system 10 by using the device 20 in which the typical browser 210 is installed.

Note that in step S803 described above, the screen forming unit 121 acquires the screen information 2000 from the screen information storage unit 150; however, the present embodiment is not so limited. For example, the screen forming unit 121 may generate the screen information 2000 based on the application information 1000.

That is, for example, the screen forming unit 121 acquires the application information 1000 associated with an application ID included in the request to acquire screen information, from the application information storage unit 140 via the application managing unit 111. Then, the screen forming unit 121 defines the information (for example, an application name and option parameters defined in the process flow information 1100) included in the application information 1000 with respect to a template of screen information stored in advance, to generate the screen information 2000.

Here, it is assumed that the user has specified a file name and mail address in the file name input field 2102 and the mail address input field 2103, and has performed a scan execution operation by pressing the scan execution button 2104, in the application screen 2100 illustrated in FIG. 10.

Then, the browser 210 of the device 20 accepts user specified information and the scan execution operation (step S805). Note that the user specified information includes the file name and the mail address specified in the file name input field 2102 and the mail address input field 2103, respectively. For example, it is assumed that "test.pdf" has been specified in the file name input field 2102 and "hoge@hogehoge.co.jp" has been specified in the mail address input field 2103. In this case, the user specified information is information including "mail_address= hoge@hogehoge.co.jp" and "filename=test.pdf".

When the scan execution operation is accepted, next, the browser 210 of the device 20 reads an original document by the scanner 26, and generates an electronic file (image file) (step S806).

When the electronic file is generated, next, the browser 210 of the device 20 sends a request to execute an application to the application executing unit 122 of the web service processing unit 120 (step S807). Note that the execution request is, for example, a HTTP request, and includes the application ID of the application information 1000 for providing the "scan to mail delivery" service, the electronic file generated in step S806, and the user specified information.

However, the request to execute an application may include, for example, a URL of the application information 1000, a screen ID of the application screen 2100 displayed in step S804, and a button ID of the scan execution button 2104, etc., instead of the application ID. That is, the request to execute an application may include various kinds of identification information that can be converted into an application ID of the application information 1000 for providing the "scan to mail delivery" service in step S808 described below, instead of an application ID.

When the request to execute an application is received, the application executing unit 122 of the web service processing unit 120 sends the request to the logic processing unit 112 of the input output service processing unit 110 (step S808). Note that when the request to execute an application includes, for example, a URL of the application information 1000, a screen ID of the application screen 2100, and a button ID of the scan execution button 2104, etc., the application executing unit 122 converts these identification information items into an application ID.

When the request to execute an application is received, next, the logic processing unit 112 of the input output service processing unit 110 preforms a process of executing a process flow (step S809). That is, the logic processing unit 112 executes a sequence of processes based on the process flow information 1100 included in the application information 1000 having the application ID included in the request. Note that details of the process of executing a process flow are described below.

Then, the logic processing unit 112 returns the process result of the process of executing a process flow, to the browser 210 via the web service processing unit 120. Accordingly, the service providing system 10 according to the present embodiment is able to provide various services realized by the sequence of processes (process flow) based on the process flow information 1100.

Note that in the overall process of the "scan to mail delivery" service illustrated in FIG. 8, the browser 210 sends a request to execute an application to the logic processing unit 112 via the web service processing unit 120; however, the present embodiment is not so limited. For example, the browser 210 may directly send the request to execute an application to the logic processing unit 112, by calling a Web API based on JavaScript, etc., defined in the screen information 2000.

Figure 11:
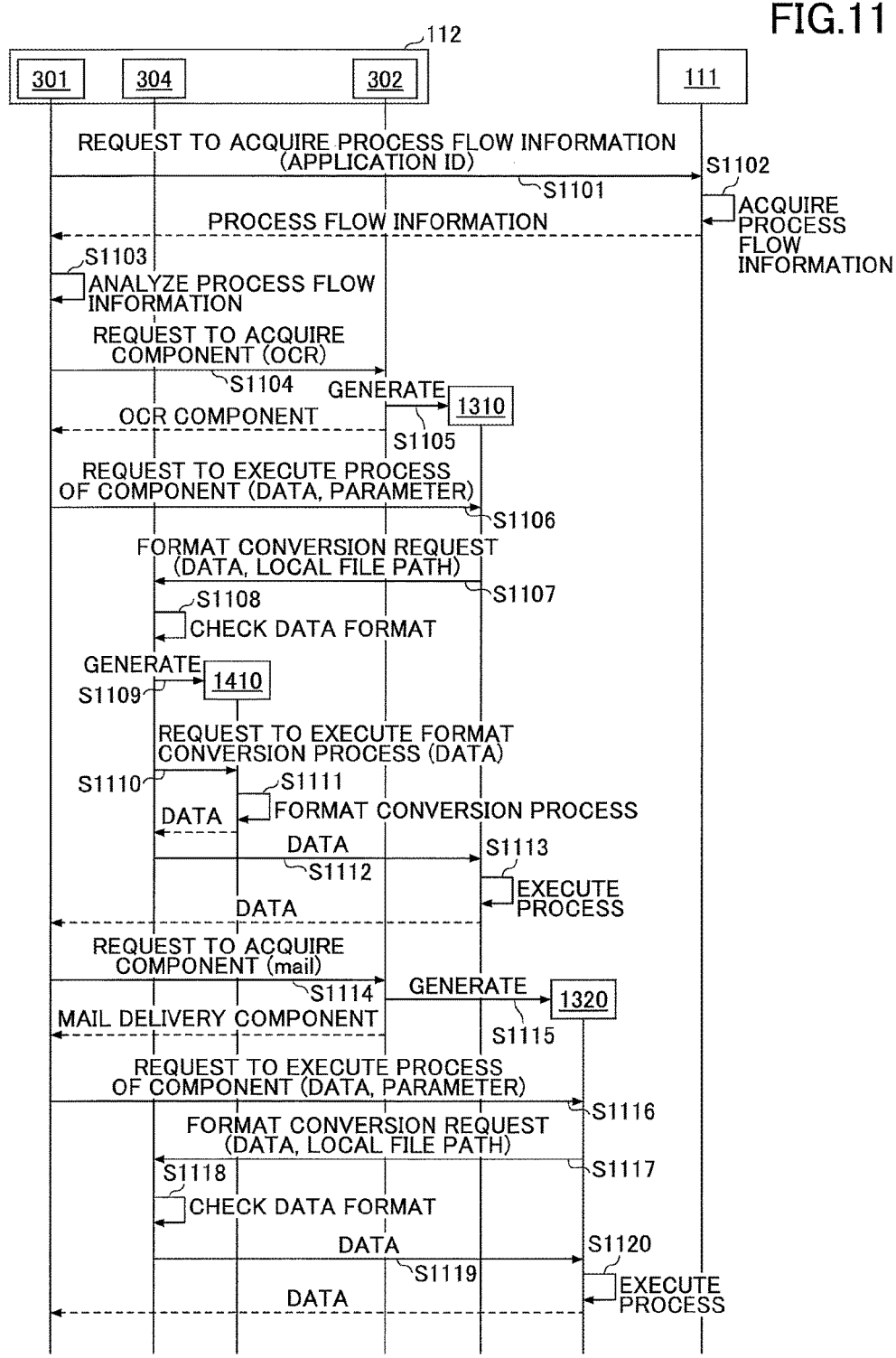
FIG. 11 is a sequence diagram illustrating an example of a process of executing a process flow according to the first embodiment of the present invention.

In the following, a description is given of details of the process of executing a process flow (process of step S809 in FIG. 8), by referring to FIG. 11. FIG. 11 is a sequence diagram illustrating an example of a process of executing a process flow according to the present embodiment.

When the request to execute an application is received, the flow executing unit 301 acquires an application ID from the execution request. Then, the flow executing unit 301 sends a request to acquire process flow information including the application ID, to the application managing unit 111 (step S1101).

When the request to acquire process flow information is received, the application managing unit 111 acquires, from the application information storage unit 140, the process flow information 1100 included in the application information 1000 associated with the application ID included in the acquisition request (step S1102). Then, the application managing unit 111 returns the process flow information 1100 acquired from the application information storage unit 140, to the flow executing unit 301. Here, in the following description, it is assumed that the application managing unit 111 has returned the process flow information 1100 illustrated in FIG. 7, to the flow executing unit 301.

Note that when the application information 1000 includes a plurality of process flow information items 1100, the flow executing unit 301 is to send a request to acquire process flow information including an application ID and a flow ID for uniquely identifying the process flow information 1100, in step S1101.

When the process flow information 1100 is received from the application managing unit 111, the flow executing unit 301 analyzes the process flow information 1100 (step S1103). That is, the flow executing unit 301 identifies components, etc., necessary for executing the process flow.

Next, the flow executing unit 301 sends a request to acquire a component to the component managing unit 302, based on the analyzed process flow information 1100 (step S1104). That is, the flow executing unit 301 sends a request to acquire a component including "ocr:ocr_process" defined in the process definition 1101 of the process flow information 1100 illustrated in FIG. 7, to the component managing unit 302.

When the request to acquire a component is received, the component managing unit 302 generates the OCR component 1310 corresponding to "ocr:ocr_process" included in the acquisition request (step S1105). Note that the OCR component 1310 may be generated by using the component common I/F 1300.

Then, the component managing unit 302 returns the generated OCR component 1310 to the flow executing unit 301. That is, for example, the component managing unit 302 returns an address in a memory (for example, the RAM 14) in which the OCR component 1310 is loaded, to the flow executing unit 301.

When the OCR component 1310 is returned, the flow executing unit 301 sends a request to execute a process of the component, to the OCR component 1310 (step S1106). Note that the request to execute a process of the component includes data and parameters.

Here, in step S1106, data means the electronic file received from the electronic file (an electronic file included in the request to execute an application) having a data format "InputStream", received from the application executing unit 122. That is, the flow executing unit 301 sends the electronic file received from the application executing unit 122, simply as "data" (without considering the data format), to the OCR component 1310. In the following, an electronic file without considering the data format is simply referred to as "data".

Furthermore, an option parameter is not defined in the process definition 1101, and therefore in step S1106, null is specified in the parameter.

When the request to execute a component is received, the OCR component 1310 sends a format conversion request to the format conversion managing unit 304 (step S1107). Note that the format conversion request includes the data and a specification of "LocalFilePath" indicating a data format that can be handled by the OCR component 1310.

When the format conversion request is received, the format conversion managing unit 304 checks whether the data format of the data included in the format conversion request matches the specified data format (step S1108).

Here, the data format of the data included in the format conversion request is "InputStream", whereas the specified data format is "LocalFilePath". Therefore, the format conversion managing unit 304 determines that the data format of the data included in the format conversion request does not match the specified data format.

Then, the format conversion managing unit 304 refers to the format conversion information table 3000, and identifies a format conversion for converting the data format "InputStream" to the data format "LocalFilePath" (here, the first format conversion 1410 is identified). Then, the format conversion managing unit 304 generates the identified first format conversion 1410 (step S1109). Note that the first format conversion 1410 may be generated by using the format conversion common I/F 1400.

Next, the format conversion managing unit 304 sends a request to execute a format conversion process to the first format conversion 1410 (step S1110). Note that the execution request includes the data.

When the request to execute format conversion is received, the first format conversion 1410 performs a format conversion process of converting the data format of the data included in the execution request, from "InputStream" to "LocalFilePath" (step S1111). Then, the first format conversion 1410 returns the data whose data format has been converted, to the format conversion managing unit 304.

Then, when the data is received from the first format conversion 1410, the format conversion managing unit 304 sends the data to the OCR component 1310 (step S1112).

When the data is received from the format conversion managing unit 304, the OCR component 1310 executes a process with respect to the data (step S1113). That is, the OCR component 1310 performs an OCR process on the electronic file indicated by the data (data format "LocalFilePath"), by the OCR processing unit 131 of the document service unit 130.

Then, the OCR component 1310 returns data indicating the process result to the flow executing unit 301. Note that the data returned here is data (data format "LocalFilePath") indicating the electronic file that has undergone the OCR process by the OCR component 1310.

Next, the flow executing unit 301 sends a request to acquire a component to the component managing unit 302, based on the process flow information 1100 analyzed in step S1103 (step S1114). That is, the flow executing unit 301 sends a request to acquire a component including "mail: send" defined in the process definition 1102 of the process flow information 1100 illustrated in FIG. 7, to the component managing unit 302.

When the request to acquire a component is received, the component managing unit 302 generates the mail delivery component 1320 corresponding to "mail:send" included in the acquisition request (step S1115). Note that the mail delivery component 1320 may be generated by using the component common I/F 1300.

Then, the component managing unit 302 returns the generated mail delivery component 1320 to the flow executing unit 301. That is, for example, the component managing unit 302 returns an address in a memory (for example, the RAM 14) in which the mail delivery component 1320 is loaded, to the flow executing unit 301.

When the mail delivery component 1320 is returned, the flow executing unit 301 sends a request to execute a process of a component, to the mail delivery component 1320 (step S1116). Note that the request to execute a process of a component includes the data and parameters.

Here, in step S1116, the parameters include an option parameter "mail_address=null&filename=null" of the process definition 1102 and user specified information.

When the request to execute a process of a component is received, the mail delivery component 1320 sends a format conversion request to the format conversion managing unit 304 (step S1117). Note that the format conversion request includes the data and a specification of "LocalFilePath" indicating a data format that can be handled by the mail delivery component 1320.

When the format conversion request is received, the format conversion managing unit 304 checks whether the data format of the data included in the format conversion request matches the specified data format (step S1118).

Here, the data format of the data included in the format conversion request is "LocalFilePath", and the specified data format is also "LocalFilePath". Therefore, the format conversion managing unit 304 determines that the data format of the data included in the format conversion request matches the specified data format.

Then, the format conversion managing unit 304 sends the data included in the format conversion request to the mail delivery component 1320 (step S1119). In this way, in the operation of checking the data format (process of step S1118), when the data format of the data and the specified data format are determined to match each other, the format conversion managing unit 304 does not generate a format conversion.

When the data is received from the format conversion managing unit 304, the mail delivery component 1320 executes a process with respect to the data, based on the parameters (step S1120). That is, the mail delivery component 1320 mails/delivers the electronic file indicated by the data, based on the parameters, by the mail delivering unit 132 of the document service unit 130.

More specifically, first, the mail delivery component 1320 defines the user specified information in the option parameter included in the parameters, as "mail_address=hoge@hogehoge.co.jp&filename=test.pdf". Next, the mail delivery component 1320 creates a mail to which an electronic file indicated by the data is attached, by the mail delivering unit 132. The attached electronic file has a file name of "test.pdf". Lastly, the mail delivery component 1320 delivers (sends) the created mail, to "hoge@hogehoge.co.jp", by the mail delivering unit 132.

Then, the mail delivery component 1320 returns data indicating a process result, to the flow executing unit 301. Note that the data returned here is, for example, information indicating that the mail has been successfully delivered by the mail delivery component 1320, etc.

As described above, the service providing system 10 according to the present embodiment performs the processes according to the respective components based on the process flow information 1100, to execute a sequence of processes (process flow). Accordingly, the service providing system 10 according to the present embodiment is able to provide a service realized by the sequence of processes.

Second Embodiment

Next, a description is given of a second embodiment. In the second embodiment, the browser 210 directly requests the logic processing unit 112 to execute an application. Note that in the second embodiment, the differences between the first embodiment and the second embodiment are mainly described, and descriptions are omitted with respect to elements having the substantially the same functions as those of the first embodiment, and the same processes as those of the first embodiment.

<Functional Configuration>

Figure 12:
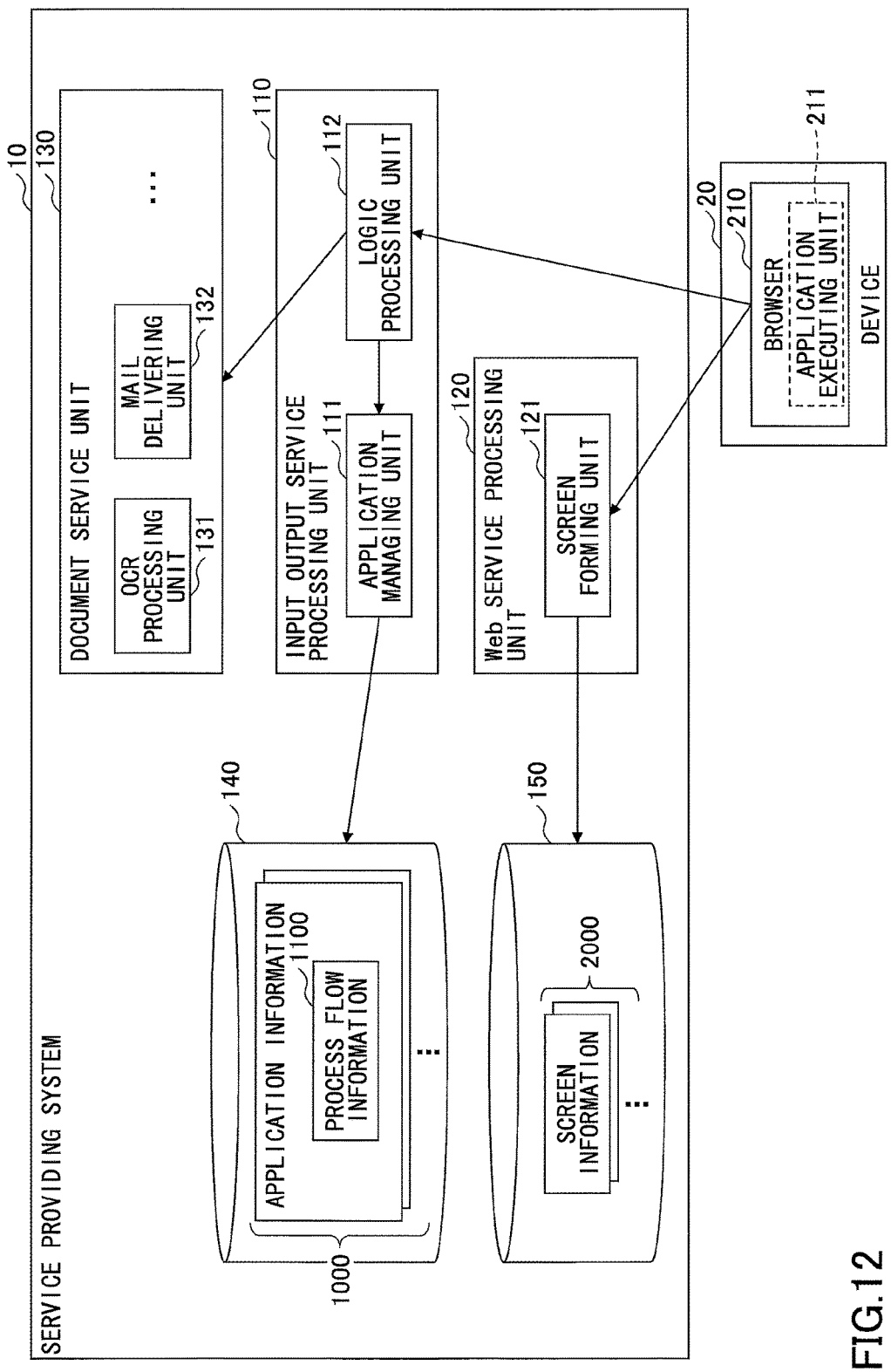
FIG. 12 illustrates a functional configuration of an example of the information processing system according to a second embodiment of the present invention.

First, a description is given of a functional configuration of the information processing system 1 according to the present embodiment, by referring to FIG. 12. FIG. 12 illustrates a functional configuration of an example of the information processing system 1 according to the present embodiment.

The web service processing unit 120 of the service providing system 10 illustrated in FIG. 12 is different from the first embodiment in that the application executing unit 122 is not included.

Furthermore, the browser 210 of the device 20 illustrated in FIG. 12 includes an application executing unit 211. For example, the application executing unit 211 is generated as JavaScript, etc., which is included in the screen information 2000, is executed by the browser 210, and the application executing unit 211 sends a request to execute an application to the logic processing unit 112 of the input output service processing unit 110.

<Process Details>

Next, a description is given of details of processes by the information processing system 1 according to the present embodiment. In the following, a description is given of the overall process in a case where the user of the device 20 uses a "scan to mail delivery" service, by referring to FIG. 13. FIG. 13 is a sequence diagram of an example of the overall process of the "scan to mail delivery" service according to the present embodiment. Note that the processes of steps S801 and S802, steps S804 through S806, and step S809 are the same as those of the first embodiment, and therefore descriptions are omitted.

When the request to acquire screen information is received, the screen forming unit 121 of the web service processing unit 120 acquires the screen information 2000 associated with the application ID corresponding to the URL specified in the acquisition request, from the screen information storage unit 150 (step S1301).

Here, it is assumed that the screen information 2000 acquired by the screen forming unit 121 includes a script such as JavaScript, etc., functioning as the application executing unit 211 by being executed by the browser 210.

Then, the screen forming unit 121 of the web service processing unit 120 returns the screen information 2000 acquired from the screen information storage unit 150, to the browser 210. Note that at this time, the screen forming unit 121 also returns an application ID corresponding to the URL, to the browser 210.

After step S806, the browser 210 of the device 20 executes a script such as JavaScript, etc., included in the screen information 2000, to generate the application executing unit 211 (step S1302).

Then, when the application executing unit 211 is generated by the browser 210, the application executing unit 211 sends a request to execute an application, to the logic processing unit 112 of the input output service processing unit 110 (step S1303). Note that the execution request includes the application ID of the application information 1000 for providing the "scan to mail delivery" service, the electronic file generated in step S806, and the user specified information.

As described above, in the information processing system 1 according to the present embodiment, the browser 210 executes JavaScript, etc., included in the screen information 2000, such that the browser 210 directly requests the logic processing unit 112 to execute an application.

<Overview>

As described above, in the information processing system 1 according to the first embodiment, a user is able to use a service provided by the service providing system 10 by using the device 20 in which a typical browser 210 is installed. That is, in the information processing system 1 according to the present embodiment, for example, there is no need to install an application program, etc., which is exclusively used for using services provided by the service providing system 10, in the device 20.

Furthermore, in the information processing system 1 according to the first embodiment, for example, an application developer such as a third vendor is able to add a service to be provided by the service providing system 10, by creating the application information 1000 and the screen information 2000. Furthermore, the application developer is able to easily create the process flow information 1100 included in the application information 1000, by sequentially defining components for performing the respective processes in the sequence of processes for realizing a service.

Therefore, in the information processing system 1 according to the present embodiment, an application for providing a service realized by a sequence of processes can be easily developed, and the labor hours required for the development can be reduced.

Furthermore, in the information processing system 1 according to the second embodiment, the browser 210 executes JavaScript, etc., included in the screen information 2000, such that the browser 210 can directly request the logic processing unit 112 to execute an application. Therefore, in the information processing system 1 according to the second embodiment, various devices, in which general-purpose web browsers are installed, can directly execute a process flow for realizing various services.

According to one embodiment of the present invention, it is possible to support the development of an application for performing a sequence of processes.

The information processing system, the information processing apparatus, and the information processing method are not limited to the specific embodiments described in the detailed description, and variations and modifications may be made without departing from the spirit and scope of the present invention.

What is claimed is:

1. An information processing system coupled, via a network, to one or more devices in which a web browser is installed, the information processing system comprising:
   one or more information processing apparatuses configured to implement various functions of the information processing system, the one or more information processing apparatuses each including,
   a memory; and a central processing unit CPU configured to,
store, in the memory, flow information in association with application identification information identifying an application of a plurality of applications, with respect to each of the applications for executing a sequence of processes using electronic data, the flow information defining program identification information identifying one or more of a plurality of programs for executing processes in the sequence of processes and an execution order of executing the one or more of the programs,
store, in the memory, screen information in association with the application identification information with respect to each of the applications, the screen information defining a screen in a format that is interpretable by the web browser,
transmit, to a first device that is a source of a first request, the screen information stored in the memory in association with the application identification information included in the first request, when the first request including the application identification information is received from the first device among the one or more devices,
receive a second request including information related to the electronic data, the electronic data being generated by the first device upon receiving an instruction specified by a user via the screen displayed on the first device, the screen being displayed as the web browser interprets the screen information,
acquire the flow information stored in the memory in association with the application identification information, when the CPU receives the second request, and
execute the one or more of the programs identified by the program identification information defined in the flow information, in the execution order defined in the flow information, to execute the sequence of processes using the electronic data based on the information relating to the electronic data included in the second request received by the CPU.

2. The information processing system according to claim 1, wherein the CPU is configured to,
receive a first Hypertext Transfer Protocol HTTP request including the application identification information from the first device,
send, to the first device that is a source of the first HTTP request, a HTTP response including the screen information stored in the memory in association with the application identification information,
receive a second HTTP request including the information relating to the electronic data specified by the user in the screen displayed on the first device, the screen being displayed as the web browser interprets the screen information included in the HTTP response sent by the CPU, and
acquire the flow information stored in the memory in association with the application identification information, when the CPU receives the second HTTP request.

3. The information processing system according to claim 2, wherein the CPU is configured to receive the second HTTP request, which is sent as the web browser interprets script information included in the screen information.

4. The information processing system according to claim 1, wherein
the plurality of programs include at least
a program for performing a process of delivering a mail to which the electronic data is attached, to a specified mail address, and
a program for performing an optical character recognition OCR process on the electronic data.

5. The information processing system according to claim 1, wherein the second request includes a parameter specified by the user in the screen, and the CPU is configured to,
use the specified parameter to execute the one or more of the programs identified by the program identification information defined in the flow information, in the execution order defined in the flow information, to execute the sequence of processes using the electronic data based on the information relating to the electronic data included in the second request.

6. The information processing system according to claim 1, wherein
the screen information is information defining the screen by one of or a combination of any of HyperText Markup Language HTML, Extensible HyperText Markup Language XHTML, Cascading Style Sheets CSS and JavaScript.

7. The information processing system according to claim 1, wherein
the applications include an application for delivering a mail, which includes the electronic data sent from the one or more devices, to a specified mail address.

8. An information processing apparatus coupled, via a network, to one or more devices in which a web browser is installed, the information processing apparatus comprising:
a memory; and
a central processing unit CPU configured to,
store, in the memory, flow information in association with application identification information identifying an application of a plurality of applications, with respect to each of the applications for executing a sequence of processes using electronic data, the flow information defining program identification information identifying one or more of a plurality of programs for executing processes in the sequence of processes and an execution order of executing the one or more of the plurality of programs,
store, in the memory, screen information in association with the application identification information with respect to each of the applications, the screen information defining a screen in a format that is interpretable by the web browser;
transmit, to a first device that is a source of a first request, the screen information stored in the memory in association with the application identification information included in the first request, when the first request including the application identification information is received from the first device among the one or more devices,
receive a second request including information related to the electronic data, the electronic data being generated by the first device upon receiving an instruction specified by a user via the screen, the screen being displayed as the web browser interprets the screen information,
acquire the flow information stored in the memory in association with the application identification information, when the CPU receives the second request, and execute the one or more of the plurality of programs identified by the program identification information defined in the flow information, in the execution order defined in the flow information, to execute the sequence of processes using the electronic data based on the information relating to the electronic data included in the second request received by the CPU.

9. An information processing method performed by an information processing system including one or more information processing apparatuses configured to implement various functions of the information processing system, the information processing system being coupled, via a network, to one or more devices in which a web browser is installed, the information processing system including a memory configured to (i) store flow information in association with application identification information identifying an application of a plurality of applications, with respect to each of the applications for executing a sequence of processes using electronic data, the flow information defining program identification information identifying one or more programs for executing processes in the sequence of processes and an execution order of executing the one or more of the programs, and (ii) store screen information in association with the application identification information with respect to each of the applications, the screen information defining a screen in a format that is interpretable by the web browser, the information processing method comprising:

sending, to a first device that is a source of a first request, the screen information stored in the memory in association with the application identification information included in the first request, when the first request including the application identification information is received from the first device among the one or more devices;

receiving a second request including information related to the electronic data, the electronic data being generated by the first device upon receiving an instruction specified by a user via the screen, the screen being displayed as the web browser interprets the screen information;

acquiring the flow information stored in the memory in association with the application identification information, when the second request is received; and executing the one or more of the programs identified by the program identification information defined in the flow information, in the execution order defined in the flow information, to execute the sequence of processes using the electronic data based on the information relating to the electronic data included in the second request.

\* \* \* \* \*